(12) United States Patent
Bekiares et al.

(10) Patent No.: US 8,976,813 B2
(45) Date of Patent: Mar. 10, 2015

(54) SECURE QUALITY OF SERVICE

(75) Inventors: Tyrone D. Bekiares, Chicago, IL (US); Robert A. Fredericks, Carol Stream, IL (US); Adam C. Lewis, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 290 days.

(21) Appl. No.: 13/227,555

(22) Filed: Sep. 8, 2011

(65) Prior Publication Data

US 2013/0064104 A1    Mar. 14, 2013

(51) Int. Cl.
*H04L 9/00* (2006.01)
*H04L 29/06* (2006.01)
*H04L 12/851* (2013.01)

(52) U.S. Cl.
CPC ............ *H04L 63/1466* (2013.01); *H04L 47/24* (2013.01)
USPC ............................ 370/474; 713/151; 713/161

(58) Field of Classification Search
CPC ......................................... H04W 12/00–12/12
USPC .................................. 370/474; 713/151, 171
See application file for complete search history.

(56) References Cited

U.S. PATENT DOCUMENTS

| | | | |
|---|---|---|---|
| 2002/0138732 A1* | 9/2002 | Irvin .............................. | 713/176 |
| 2004/0125797 A1* | 7/2004 | Raisanen ....................... | 370/389 |
| 2005/0204170 A1* | 9/2005 | Belenky et al. ............... | 713/201 |
| 2006/0085861 A1* | 4/2006 | Belenky et al. ................ | 726/26 |
| 2007/0133547 A1* | 6/2007 | Ko et al. ........................ | 370/392 |
| 2008/0184276 A1* | 7/2008 | Jong .............................. | 719/321 |
| 2010/0046452 A1* | 2/2010 | Kim et al. ..................... | 370/329 |
| 2010/0135287 A1* | 6/2010 | Hosain et al. ................. | 370/389 |

OTHER PUBLICATIONS

Prakash, B. "Using the 20 bit flow label field in the IPv6 header to indicate desirable quality of service on the internet", University of Colorado, Master of Science Thesis, 2004.*
Lin, C. Tseng, P. and Hwang, W., "End-to-End QoS Provisioning by Flow Label in IPv6", JCIS, 2006.*
PCT International Search Report Dated January 21, 2013 for Counterpart Application PCT/US2012/053037.
S. Amante, et al., "IPv6 Flow Label Specification; Draft-IETF-6MAN-Flow-3697BIS-07.Txt"; Internet Engineering Task Force, IETF; Standardworkingdraft, Internet Society (ISOC) Geneva, Switzerland, No. 7, Jul. 29, 2011, pp. 1-17; XP015077523; Abstract, p. 5-p. 12.

(Continued)

*Primary Examiner* — Benjamin Lamont
(74) *Attorney, Agent, or Firm* — Daniel R. Bestor; Steven A. May

(57) ABSTRACT

Methods and apparatus are provided for communicating a flow of packets with a requested quality of service. An exemplary method involves receiving a first packet of a flow, determining a first reference value for the packet flow identification field of the first packet using a key value, and facilitating the requested quality of service for the first packet when the received value of the packet flow identification field of the first packet matches the first reference value. The method continues by receiving a second packet of the flow, determining a second reference value for the packet flow identification field using the key value, and facilitating the requested quality of service for the second packet when the received value of the packet flow identification field of the second packet matches the second reference value.

14 Claims, 4 Drawing Sheets

(56) References Cited

OTHER PUBLICATIONS

Gont; Security Assessment of the IPv6 Flow Label; Internet Engineering Task Force, IETF; Standardworkingdraft, Internet Society (ISOC); Geneva, Switzerland, No. 1, November 17, 2010, p. 1-20, XP015072633, Abstract p. 3-p. 12.

B. Carpenter, et al. Update to the IPv6 Flow Label Specification; Internet Engineering Task Force, IETF; Standardworkingdraft, Internet Society (ISOC); Geneva, Switzerland, No. 3, May 7, 2010, p. 1-11, XP015068433, Abstract p. 3-p. 6.

Sebastian Zander, et al. "A Survey of Covert Channels and Countermeasures in Computer Network Protocols", IEEE Communications Surveys, IEEE, New York, NY, USA; vol. 9, No. 3, Jul. 1, 2007, p. 44-p. 57, XP011383439, ISSN:1553-877X, D01: 10.1109/COMST.2007.4317620, Abstract, p. 45-p. 47.

M. Carli, et al. Secret Communication by Using Data Hiding in IPv6, SPIE, Bellington, WA; Dec. 31, 2007; p. 1-7; XP040239343, DOI:10.1117/12.720708; Entire Document.

Hu, et al. Survey of Proposed Use Cases for the IPv6 Flow Label; Internet Engineering Task Force, IETF; Standardworkingdraft, Internet Society (ISOC)Geneva, Switzerland, No. 3, Feb. 23, 2011; p. 1-19, XP015074090, Abstract p. 4-p. 10.

Anne Marie Hegland, et al. "Securing QoS Signaling in IP-Based Military Ad Hoc Networks", IEEE Communications Magazine; Nov. 2008; 7 Pages.

\* cited by examiner

SECURE QUALITY OF SERVICE

TECHNICAL FIELD

Embodiments of the subject matter described herein relate generally to communications systems, and more particularly to securely providing enhanced quality of service to a packet flow.

BACKGROUND

Communications networks are widely utilized to communicate information. For example, wired networks or wireless networks may support communications among numerous different electronic devices and/or users. In practice, it may be desirable to prioritize or otherwise allocate resources to different flows of information within a communications network, colloquially known as quality of service (QoS). For example, it may be desirable to prioritize communications among military or public safety personnel. At the same time, it is desirable to prevent abuse or exploitation of QoS mechanisms, which could impair network performance or interfere with the prioritization of other users.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Embodiments of the subject matter described herein generally relate to securely labeling a packet flow for the purpose of identifying and applying requested quality of service (QoS) attributes to said flow in network routing devices. As used herein, QoS attributes, or simply QoS, should be understood as referring to designations of special processing of a packet flow with respect to default or best effort processing, such as, for example, an elevated priority, a guarantee of data rate, a guarantee of delivery time, a guarantee of reliability, and the like. As described in greater detail below, in exemplary embodiments, the requested QoS is provided in a secure manner by varying values of a field of a packet header (e.g., the flow label field for an IPv6 packet, the differentiated services code point field and/or type of service field for an IPv4 packet, or other identification field, among other possibilities), alternatively referred to herein as the packet flow identification field, across the packet flow on a packet-by-packet basis. In an exemplary embodiment, the device transmitting the packets of the packet flow and the device that functions as a QoS enforcement point are each provisioned with a common key value. The transmitting device utilizes the key value to generate pseudorandom values for the varying packet flow identification field for each packet of the packet flow, and the QoS enforcement device utilizes the key value to generate reference values for the packet flow identification field of each packet. When the QoS enforcement device receives a packet of the packet flow that has a value for the packet flow identification field that matches the reference value for that packet, the QoS enforcement device provides or otherwise facilitates the requested QoS when the packet is transmitted over a communications network downstream from the QoS enforcement device.

Figure 1:
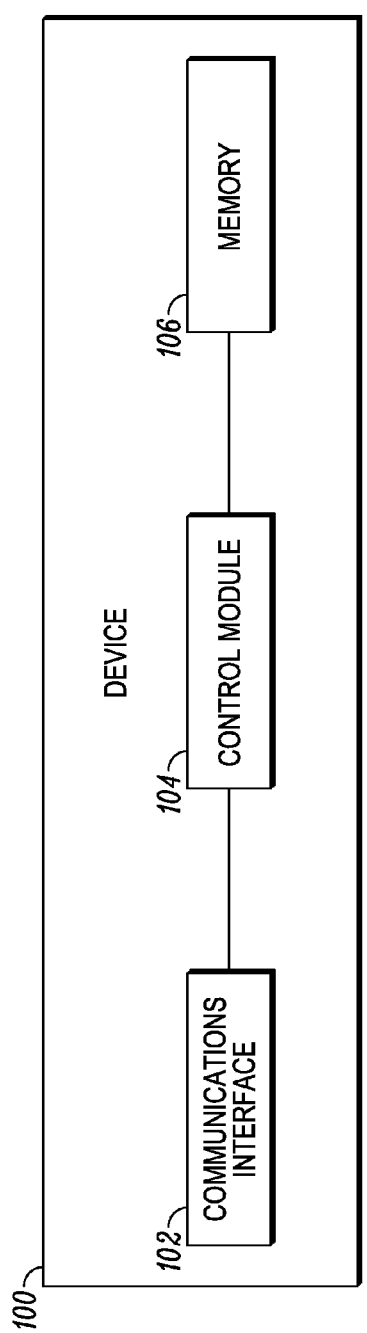
FIG. 1 is a block diagram of an exemplary embodiment of a communications device.

FIG. 1 depicts an exemplary embodiment of a communications device 100 capable of communicating with other devices over a communications network. The illustrated embodiment of the communications device 100 includes, without limitation, a communications interface 102, a control module 104, and a memory 106. It should be understood that FIG. 1 is a simplified representation of the communications device 100 for purposes of explanation, and FIG. 1 is not intended to limit the subject manner in any way. For example, depending on the embodiment, the communications device 100 may be configured to function as a gateway device or another network infrastructure device (e.g., a router, a switch, or the like), or a server or another computing device.

In the illustrated embodiment of FIG. 1, the communications interface 102 generally represents the hardware, software, firmware and/or combination thereof configured to transmit and/or receive data packets directed to and/or from the communications device 100 via a communications network. In this regard, the communications interface 102 may include one or more amplifiers, filters, modulators and/or demodulators, digital-to-analog converters (DACs), analog-to-digital converters (ADCs), mixers, antennas, or the like. The control module 104 generally represents the hardware, software, firmware, processing logic, and/or other components or combinations thereof that are coupled to the communications interface 102 to support communications to and/or from the device 100 and execute various functions and/or processing tasks described in greater detail below. Depending on the embodiment, the control module 104 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by control module 104, or in any practical combination thereof. The memory 106 represents any nontransitory short or long term storage media capable of storing programming instructions for execution by the control module 104, including any sort of random access memory (RAM), read only memory (ROM), flash memory, registers, hard disks, removable disks, magnetic or optical mass storage, and/or the like. The programming instructions, when read and executed by the control module 104, cause the control module 104 to execute an application and perform certain tasks, operations, functions, and processes described in more detail herein.

Figure 2:
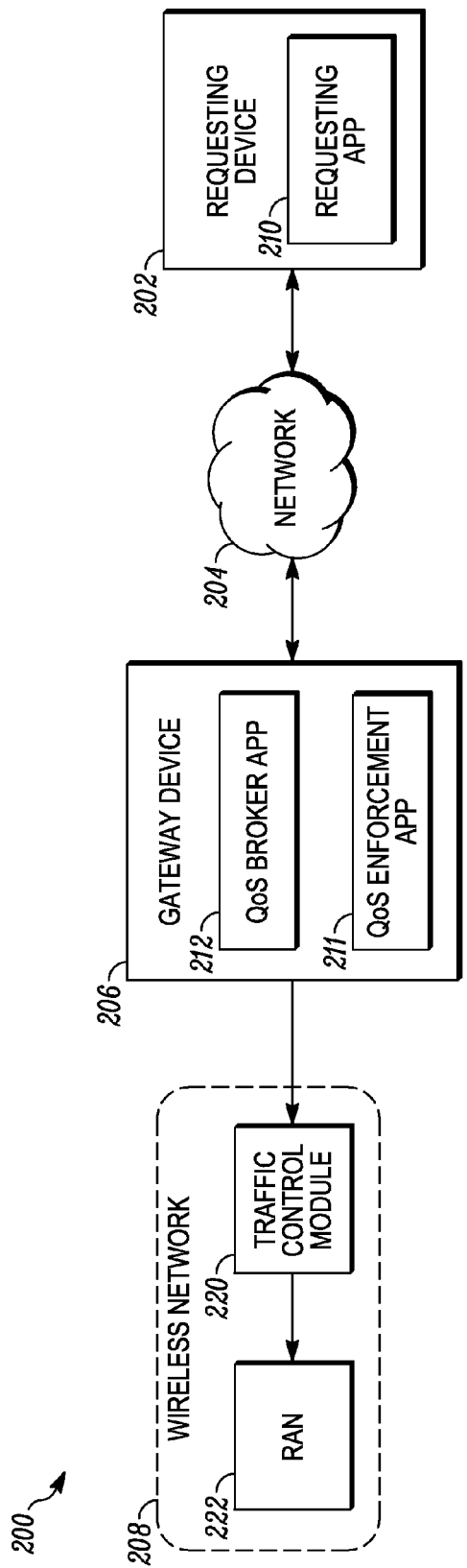
FIG. 2 is a block diagram of an exemplary communications system in accordance with one embodiment.

FIG. 2 depicts an exemplary embodiment of a communications system 200. The communications system 200 includes, without limitation, a QoS requesting device 202, a first communications network 204, a network routing device 206, and a second communications network 208. As described in greater detail below, in an exemplary embodiment, the network routing device 206 is realized as a gateway device that provides an interface between the communications networks 204, 208 and functions as a QoS enforcement point that facilitates or otherwise supports transmitting data packets from the QoS requesting device 202 over the second communications network 208 with a requested QoS, as described in greater detail below. It should be understood that FIG. 2 is a simplified representation of a communications system for purposes of explanation, and FIG. 2 is not intended to limit the subject manner in any way.

In an exemplary embodiment, the first communications network 204 and the second communications network 208 are independent and distinct communications networks. For example, in accordance with one or more embodiments, the first communications network 204 is realized as a wired and/or wireless computer network, such as an enterprise private network, and the second communications network 208 is realized as a wireless network, such as a cellular network or another mobile broadband network, a radio network, or the like. In this regard, the second communications network 208 may support communications among users and/or devices that are not supported by the first communications network 204, and vice versa. For convenience, but without limitation, the first communications network 204 may alternatively be referred to herein as an enterprise network and the second communications network 208 may alternatively be referred to herein as a wireless network.

In the illustrated embodiment of FIG. 2, the gateway device 206 represents a gateway, router, switch, or other network infrastructure device that is communicatively coupled to both the enterprise network 204 and the wireless network 208 and configured to translate data packets from the enterprise network 204 to a format supported by the wireless network 208. In an exemplary embodiment, the gateway device 206 is suitably configured to execute a QoS enforcement application 211 configured to facilitate or otherwise support transmitting data packets from the QoS requesting device 202 over the second communications network 208 with a requested QoS. Depending on the embodiment, the QoS requesting device 202 may be realized as any communications device or computing device capable of communicating over the enterprise network 204, such as, for example, a desktop computer, a laptop computer, a server, a netbook computer, a tablet, a personal digital assistant, a mobile phone, a voice over IP (VoIP) phone, or the like. In an exemplary embodiment, the QoS requesting device 202 executes a requesting application 210 that communicates with a QoS broker application 212 executed by the gateway device 206 to support a QoS control process 400 for transmitting data packets from the QoS requesting device 202 over the second communications network 208 with a requested QoS, as described in greater detail below with reference to FIGS. 4-5.

Still referring to FIG. 2, in an exemplary embodiment, the wireless network 208 includes a traffic control module 220 and a radio access network (RAN) 222. The RAN 222 generally represents the transceivers, amplifiers, antennas, and other hardware configured to wirelessly transmit or otherwise communicate signals over the air. In an exemplary embodiment, the traffic control module 220 is coupled to the gateway device 206 and generally represents the hardware, software, firmware and/or combinations thereof configured to receive data packets and related QoS control information from the gateway device 206 and effectuate the requested QoS for the data packets being transmitted from the QoS requesting device 202. For example, the traffic control module 220 may implement a policy and charging rules function (PCRF) and/or a packet gateway function (PGW), such that data packets transmitted from the QoS requesting device 202 receive the requested QoS when transmitted by the RAN 222.

Figure 3:
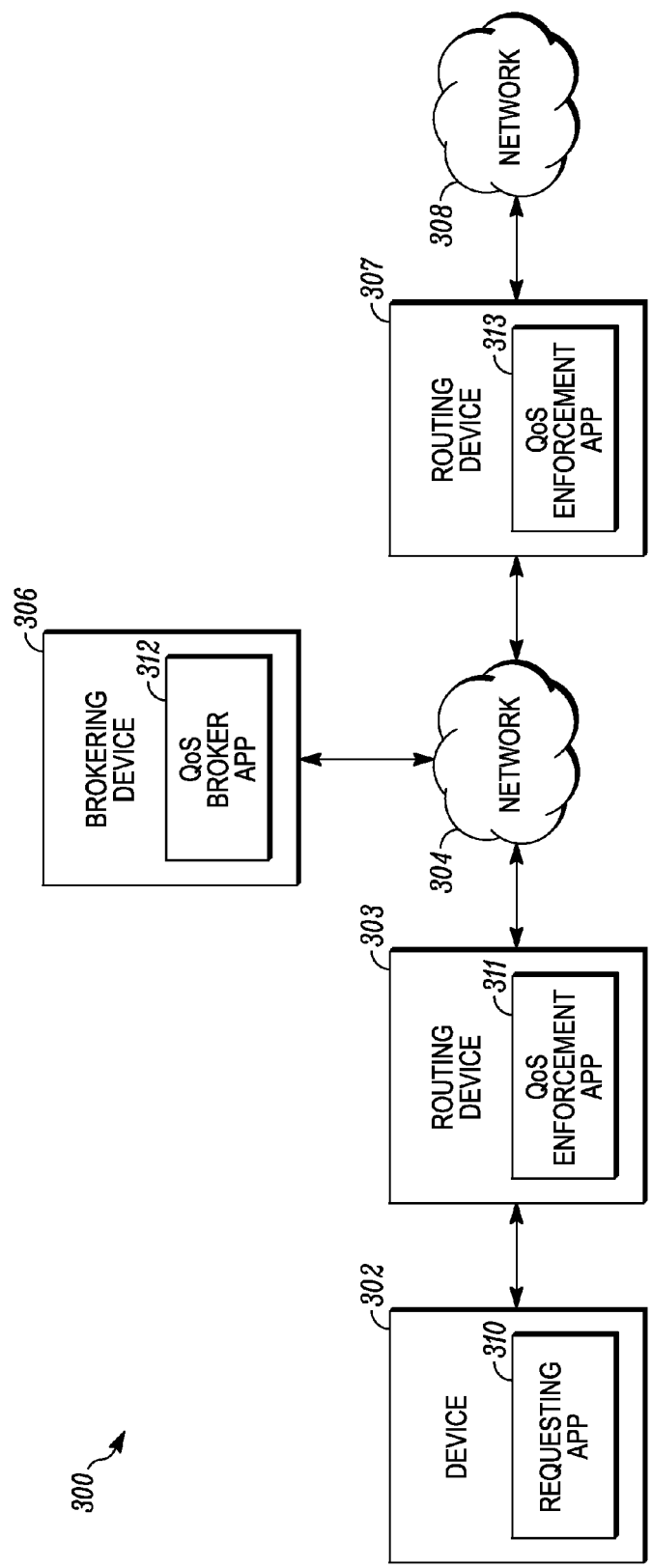
FIG. 3 is a block diagram of another exemplary communications system in accordance with another embodiment.

FIG. 3 depicts another exemplary embodiment of a communications system 300. In the embodiment of FIG. 3, the QoS broker application 312 may be implemented by another networked device that does not function as a QoS enforcement point and is outside of the transmission path for packets transmitted by a QoS requesting device 302. The communications system 300 of FIG. 3 includes, without limitation, a QoS requesting device 302, a first communications network 304, a first network routing device 303 coupled between the QoS requesting device 302 and the first communications network 304, a second communications network 308, a second network routing device 307 coupled between the first communications network 304 and the second communications network 308, and a QoS brokering device 306 coupled to the first communications network 304. Various elements in the communications system 300 of FIG. 3 are similar to counterpart elements described above in the context of the communications system 200 of FIG. 2, and accordingly, the details of these common elements will not be redundantly described in the context of FIG. 3. Further, it should be understood that FIG. 3 is a simplified representation of an exemplary communications system for purposes of explanation, and FIG. 3 is not intended to limit the subject manner in any way.

In the illustrated embodiment of FIG. 3, the QoS brokering device 306 generally represents a computing system or another combination of other hardware, software, firmware, processing logic, and/or other components that is coupled to the first communications network 304. In an exemplary embodiment, the QoS brokering device 306 includes or otherwise accesses a memory or another non-transitory computer-readable medium capable of storing programming instructions that, when read and executed by the QoS brokering device 306, cause the QoS brokering device 306 to execute a QoS broker application 312 that communicates with a requesting application 310 executed by the QoS requesting device 302 and performs various additional tasks, operations, functions, and processes to support the QoS control process 400, as described in greater detail below.

In an exemplary embodiment, the first network routing device 303 is realized as a gateway, a router, a switch, or another network infrastructure device that is communicatively coupled to the first communications network 304 and facilitates communication of data between the QoS requesting device 302 and the first communications network 304, and the second network routing device 307 is realized as a gateway, a router, a switch, or another network infrastructure device that is communicatively coupled to both communications networks 304, 308 and facilitates communication of data between communications networks 304, 308. In some embodiments, the communications networks 304, 308 may be independent and distinct communications networks. For example, in one embodiment, the first communications network 304 is realized as a wired and/or wireless computer network and the second communications network 308 is realized as a radio network. As described in greater detail below, the network routing devices 303, 307 include or otherwise access a memory or another non-transitory computer-readable medium capable of storing programming instructions that, when read and executed by a respective network routing device 303, 307, cause that network routing device 303, 307 to execute a QoS enforcement application 311, 313 that supports the QoS control process 400, as described in greater detail below.

Figure 4:
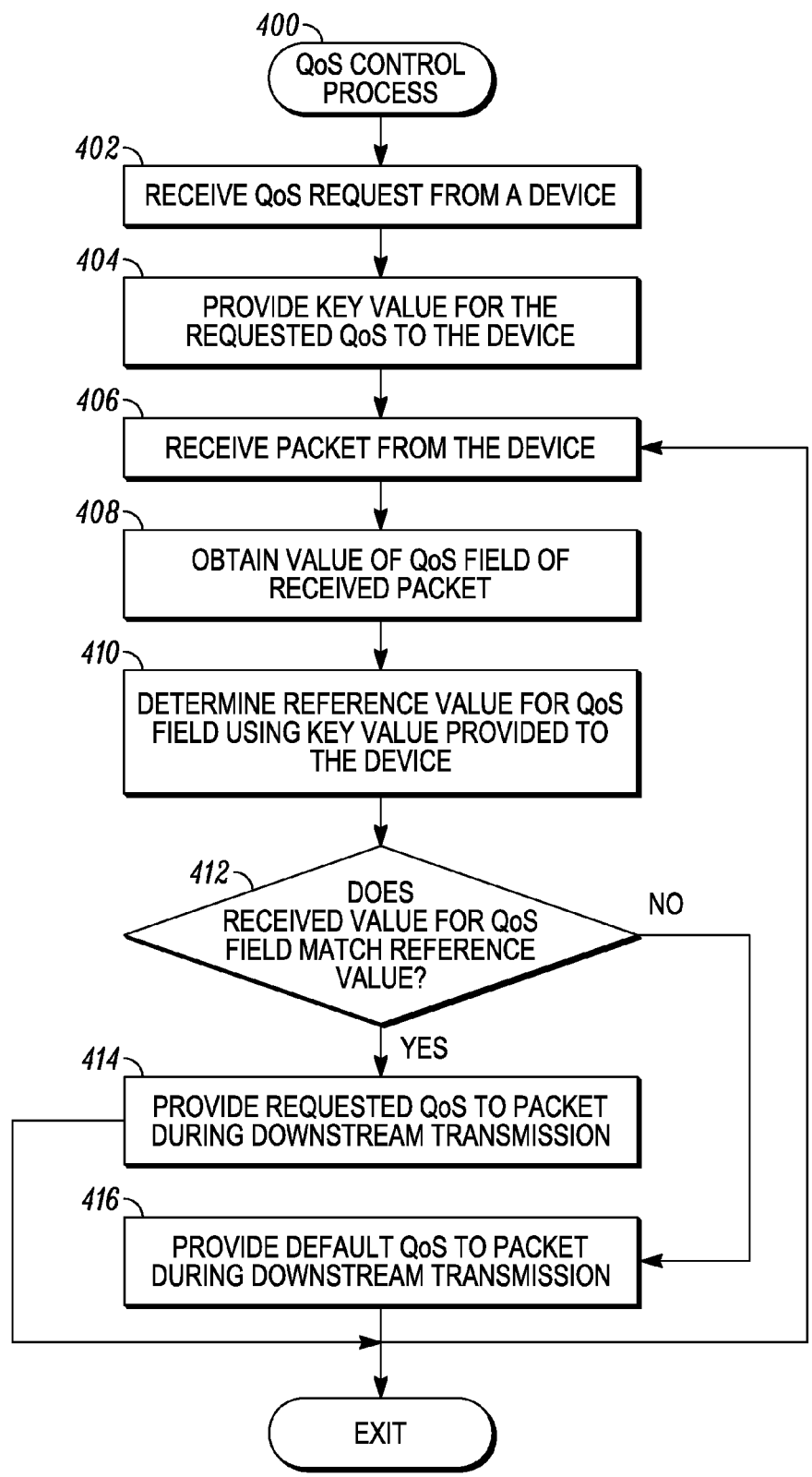
FIG. 4 is a flow diagram of an exemplary quality of service control process suitable for use with either the communications system of FIG. 2 or the communications system of FIG. 3.

Referring now to FIG. 4, in an exemplary embodiment, a communications system is configured to perform a QoS control process 400 and additional tasks, functions, and operations described below. The various tasks may be performed by software, hardware, firmware, or any combination thereof. For illustrative purposes, the following description may refer to elements mentioned above in connection with FIGS. 1-3. In practice, the tasks, functions, and operations may be performed by different elements of the described system, such as a QoS requesting device 202, 302, a network routing device 206, 303, 305, a requesting application 210, 310, a QoS enforcement application 211, 311, 313, a QoS broker application 212, 312 and/or a traffic control module 220. It should be appreciated that the QoS control process 400 may include any number of additional or alternative tasks, the tasks need not be performed in the illustrated order and/or the tasks may be performed concurrently, and/or the QoS control process 400 may be incorporated into a more comprehensive procedure or process having additional functionality not described in detail herein. Moreover, one or more of the tasks shown and described in the context of FIG. 4 could be omitted from an embodiment of the respective process as long as the intended overall functionality remains intact.

Referring to FIG. 4, and with continued reference to FIGS. 1-3, in an exemplary embodiment, the QoS control process 400 begins in response to receiving a request for a particular QoS from a device indicative of a desire to begin transmitting or otherwise communicating data packets over a network with the requested QoS (task 402). For example, prior to transmitting data, the requesting application 210, 310 on the QoS requesting device 202, 302 communicates with the QoS broker application 212, 312 over a communications network 204, 304 and requests a particular QoS (e.g., for downstream communications on a different communications network 208, 308). In this regard, the requesting application 210, 310 may request that a packet flow transmitted by the requesting application 210, 310 be transmitted by a downstream network with a particular priority level, amount of delay, data rate and/or reliability (e.g., limited packet dropping, relatively low bit error rate, or the like).

In response to receiving the QoS request, the QoS control process 400 continues by providing a key value to the requesting device (task 404). For example, in response to receiving a QoS request from the requesting application 210, 310, the QoS broker application 212, 312 provides a key value that will be associated with the requested QoS to the requesting application 210 over the first communications network 204. As described in greater detail below, the requesting application 210, 310 utilizes the received key value to determine, for each packet subsequently transmitted by the requesting application 210, 310, a pseudorandom value for a packet flow identification field of the packet header of the packet (e.g., the flow label field for an IPv6 packet, the differentiated services code point field and/or type of service field for an IPv4 packet, or the like), wherein a QoS enforcement application 211, 311, 313 executed by a network routing device 206, 303, 307 utilizes the packet flow identification field to determine the appropriate QoS for that packet when it is subsequently transmitted over a communications network 208, 304, 308 downstream from the network routing device 206, 303, 307. In this regard, within a packet flow comprising a plurality of related packets transmitted by the requesting application 210, 310 that are intended to be handled with the requested QoS, the packet flow identification field varies dynamically on a packet-by-packet basis within the packet flow, such that each packet has a pseudorandom value for its packet flow identification field that differs from the packet flow identification field value of the preceding and/or succeeding packet. In accordance with one embodiment, the requesting application 210, 310 utilizes the received key value as a seed value for a pseudorandom number generator that is executed to generate the pseudorandom value for the packet flow identification field for each packet. In accordance with another embodiment, the requesting application 210, 310 utilizes the received key value when performing a cryptographic hash of a portion of a respective packet to generate the pseudorandom value for the packet flow identification field of that respective packet.

In an exemplary embodiment, the QoS control process 400 continues and the network routing device receives a flow of one or more packets from the QoS requesting device (task 406). For each packet received from the QoS requesting device, the QoS enforcement application on the network routing device obtains the received value of the packet flow identification field of the packet header, determines a reference value for the packet flow identification field of that packet, and determines whether the received value for the packet flow identification field matches the reference value (tasks 408, 410, 412). In response to determining that the value of the packet flow identification field of a received packet matches the reference value for that packet, the QoS control process 400 facilitates or otherwise provides the requested QoS to the received packet during downstream transmission (task 414). Conversely, when the value of the packet flow identification field of the received packet fails to match the reference value, the QoS control process 400 facilitates or otherwise provides a default QoS (e.g., best effort, dropping the packet, or the like) to the received packet during downstream transmission (task 416). As described in greater detail below, the QoS enforcement application 211, 311, 313 on the network routing device 206, 303, 307 functioning as a QoS enforcement point utilizes the same key value that was previously provided to the requesting application 210, 310 to generate pseudorandom reference values in the same manner as the requesting application. The QoS enforcement application 211, 311, 313 on the network routing device 206, 303, 307 compares the received values of the packet flow identification fields of the received packets to the pseudorandom reference values, and when the received value for the packet flow identification field of a received packet matches the reference value for that packet, the QoS enforcement application 211, 311, 313 on the network routing device 206, 303, 307 provides that packet to a downstream communications network 208, 304, 308 in a manner that ensures that the packet is subsequently transmitted over the downstream communications network 208, 304, 308 with the requested QoS. For example, in the embodiment of FIG. 2, the gateway device 206 may reformat the packet header into a format that is compliant with the wireless network 208 and modify the packet flow identification field such that it has a value that the wireless network 208 associates with the requested QoS, or alternatively, the gateway device 206 may provide the payload of the packet to the traffic control module 220 along with an indication that the payload should be transmitted over the wireless network 208 with the requested QoS. The loop defined by tasks 406, 408, 410, 412, 414 and 416 may repeat until all of the packets of the flow received from the QoS requesting device have been analyzed and provided to a downstream network, or until some other event.

Figure 5:
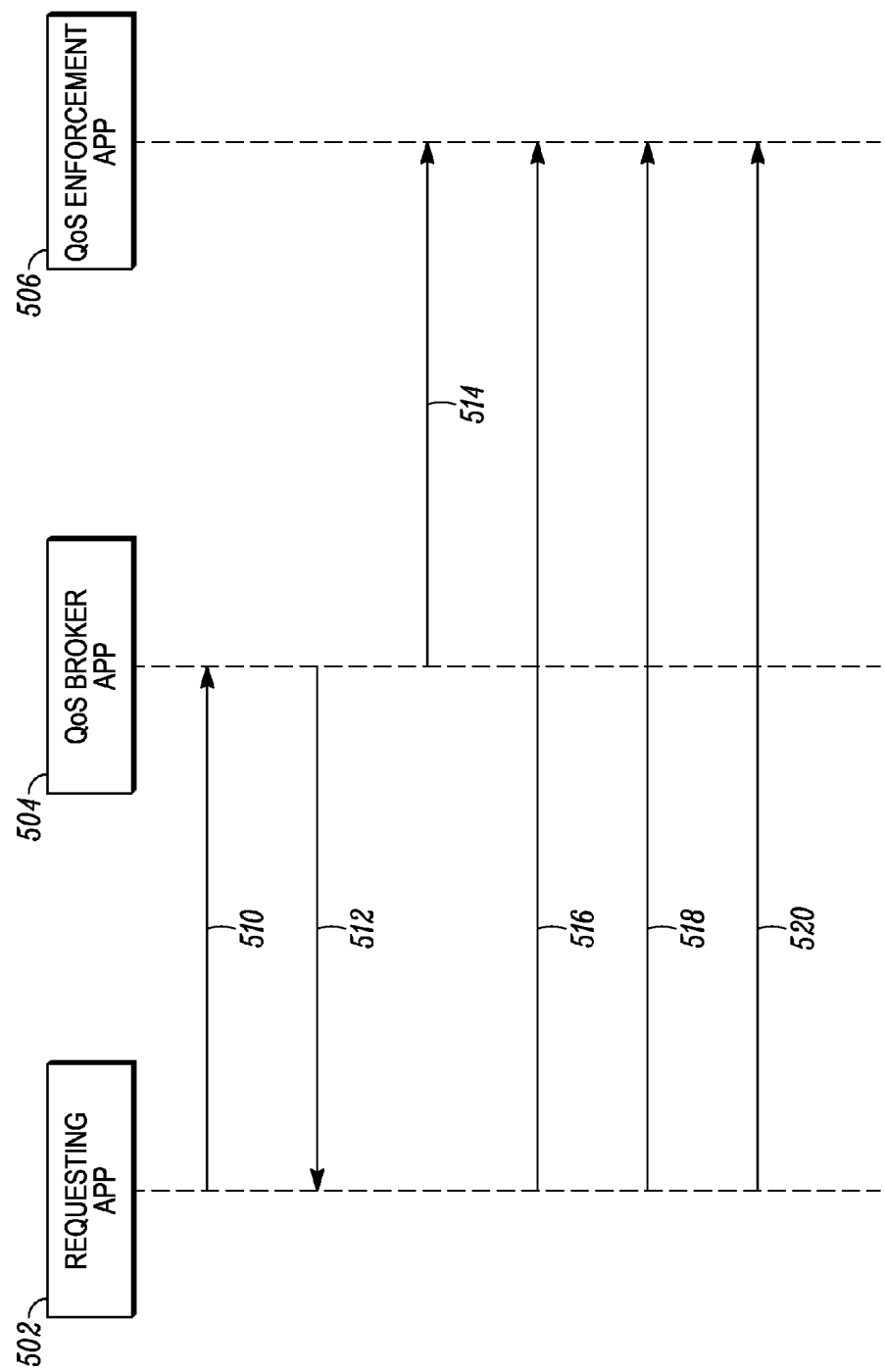
FIG. 5 is a diagram illustrating communications within a communications system in accordance with an exemplary embodiment of the quality of service control process of FIG. 4.

FIG. 5 illustrates an exemplary sequence of communications within a communications system in accordance with an exemplary embodiment of the QoS control process 400. For example, referring now to FIG. 5 and with reference to FIGS. 2 and 4, in the communications system 200, the QoS control process 400 begins in response to a requesting application 502 on a device (e.g., requesting application 210 on QoS requesting device 202) transmitting a request 510 for a particular QoS to a QoS broker application 504 (e.g., QoS broker application 212). In response to receiving the QoS request 510, the QoS broker application 504 transmits or otherwise provides a key value 512 to the requesting application 502. In some embodiments, prior to transmitting the key value 512, the QoS broker application 504 may establish a secure connection with the requesting application 502 (e.g., a secure socked connection, an https connection, or the like) and provide the key value via the secure connection. In addition to the key value, the QoS broker application 504 may also provide, to the requesting application 502, the algorithm to be utilized when generating pseudorandom values for the packet flow identification fields of transmitted packets with the key value. For example, the QoS broker application 504 may provide the requesting application 502 with the appropriate algorithm for implementing a pseudorandom number generator or cryptographic hash function using the key value. Additionally, it should be noted that in some embodiments, the results of the cryptographic hash function may contain more bits than are allotted to the packet flow identification field, in which case, the QoS broker application 504 may provide the requesting application 502 with the appropriate algorithm for selecting a particular subset (or for truncating a particular subset) of the bits of the hash value (or digest) to obtain the pseudorandom value for the packet flow identification field.

In the illustrated embodiment, the QoS broker application 504 provides or otherwise configures the QoS enforcement application 506 (e.g., QoS enforcement application 211) on the network routing device functioning as a QoS enforcement point (e.g., gateway device 206) for providing the requested QoS to received packets having values for the packet flow identification field that were generated using the key value provided to the requesting application 502 requesting that QoS. For example, the QoS broker application 504 may configure the QoS enforcement application 506 on the network routing device to implement the same pseudorandom number generator or cryptographic hash function as the requesting application 502 and with the same key value that was provided to the requesting application 502. In this regard, the QoS broker application 504 may provide 514 the same key value and pseudorandom number generation algorithm to the QoS enforcement application 506, and in some embodiments, may provide the appropriate algorithm for selecting a particular subset (or for truncating a particular subset) of the bits of a hash value (or digest) to obtain the pseudorandom value for use as a pseudorandom reference value.

Additionally, the QoS broker application 504 may configure the QoS enforcement application 506 to facilitate or otherwise provide the requested QoS when received packets have values for their packet flow identification fields that match the pseudorandom reference values determined by the QoS enforcement application 506 using the key value. For example, the QoS broker application 504 may provide information corresponding to the requested priority level, delay, data rate, reliability and the like for the network downstream from the QoS enforcement application 506. In this regard, the QoS broker application 504 may configure the QoS enforcement application 506 with fixed values that achieve the requested QoS on the downstream network (e.g., values associated with the requested priority level, delay, data rate, reliability and/or the like in the wireless network 208) to be substituted for the packet flow identification fields matching the pseudorandom reference values. It should be noted that for embodiments supporting multiple requesting applications and/or QoS requesting devices, the QoS broker application 504 may provide identifying information indicative of the requesting application and/or device requesting a particular QoS, wherein the QoS enforcement application 506 maintains an association (or mapping) between a requesting application, its requested QoS, its assigned key value, and/or the pseudorandom number generation algorithm and/or cryptographic hash function being used by that requesting application 502. In this regard, in response to receiving a packet, the QoS enforcement application 506 may analyze a portion of the packet header (e.g., the source address) to identify the transmitting device or application, and then utilize the key value and the pseudorandom number generation algorithm and/or cryptographic hash function associated with that transmitting device or application to determine pseudorandom reference values that are compared to the packet flow identification field of the received packet to provide the requested QoS associated with the transmitting device or application, as described in greater detail below.

Still referring to FIGS. 2 and 4-5, after the requesting application 502 and the QoS enforcement application 506 are configured with the key value and the pseudorandom number generator and/or cryptographic hash function, the requesting application 502 begins transmitting a flow of packets intended to be handled with the requested QoS to the QoS enforcement application 506 (e.g., via first communications network 204), wherein each packet of the flow has a pseudorandom value for its packet flow identification field of its packet header that is determined using the key value. For example, in accordance with one embodiment, the requesting application 502 utilizes the key value as the seed value for a pseudorandom number generator, wherein for each packet in the flow, the requesting application 502 executes the pseudorandom number generator to obtain the next in sequence pseudorandom value and utilizes the obtained pseudorandom value for the packet flow identification field of the packet header. In this regard, the pseudorandom number generator ensures the value of the packet flow identification field for an individual packet within the flow of packets transmitted by the requesting application 502 is different from the packet flow identification field of the preceding and/or succeeding packet in the flow. Thus, an initial packet transmitted 516 by the requesting application 502 has a first pseudorandom value for its packet flow identification field (e.g., '9876') representative of the initial output value of the pseudorandom number generator, the next packet transmitted 518 by the requesting application 502 has a second pseudorandom value for its packet flow identification field (e.g., '4756') representative of the next output value of the pseudorandom number generator, and the following packet transmitted 520 by the requesting application 502 has a third pseudorandom value for its packet flow identification field (e.g., '2453') representative of the next output value of the pseudorandom number generator, and so on. After determining the pseudorandom value for the packet flow identification field of a respective packet, the requesting application 502 transmits the packet to a downstream network routing device (e.g., via first communications network 204).

Still referring to FIG. 5, as described above, the QoS enforcement application 506 on the network routing device receives the flow of packets from the requesting application 502 and, for each packet received, determines whether the received value for the packet flow identification field of a received packet matches a pseudorandom reference value for that packet determined using the same key value and pseudorandom number generator was used by the requesting application 502 (tasks 406, 408, 410, 412). For example, prior to receiving the initial packet 516 from the requesting application 502, the QoS enforcement application 506 may execute the pseudorandom number generator using the key value provided by the QoS broker application 504 as the seed value to obtain the initial output value of the pseudorandom number generator (e.g., '9876') and utilize the initial output value of the pseudorandom number generator as an initial pseudorandom reference value. When the QoS enforcement application 506 receives the initial packet 516 from the requesting application 502, the QoS enforcement application 506 compares the received value for the packet flow identification field of the received packet 516 (e.g., '9876') to the initial pseudorandom reference value (e.g., '9876'), and in response to determining the received value for the packet flow identification field matches the reference value, the QoS enforcement application 506 provides the requested QoS to the received packet 516 (task 414). For example, the QoS enforcement application 506 may modify or otherwise reformat the received packet 516 for downstream transmission (e.g., over wireless network 208) and/or modify the packet header to include values corresponding to the requested priority level, delay, data rate, reliability and the like for the downstream network (e.g., by substituting the fixed values associated with the requested priority level, delay, data rate, reliability and/or the like for the wireless network 208 provided by the QoS broker application 212). After receiving an initial packet 516 from the requesting application 502 matching the initial pseudorandom reference value, the QoS enforcement application 506 automatically executes the pseudorandom number generator to update the pseudorandom reference value, such that the pseudorandom reference value utilized by the QoS enforcement application 506 is maintained substantially in sync with the pseudorandom number generator being utilized by the requesting application 502. When the QoS enforcement application 506 receives a subsequent packet 518 from the requesting application 502 having a packet flow identification field value matching the updated pseudorandom reference value (e.g., '4756'), the QoS enforcement application 506 provides the requested QoS to the received packet 518, as described above.

It should be noted that in some embodiments, the QoS enforcement application 506 may execute the pseudorandom number generator a multiple number of times to obtain the upcoming sequence of output values of the pseudorandom number generator to protect against lost or dropped packets. For example, prior to receiving any packets from the requesting application 502, the QoS enforcement application 506 may execute the pseudorandom number generator three times to obtain the initial three output values of the pseudorandom number generator (e.g., '9876', '4756', and '2453') as a sequence of pseudorandom reference values. In this regard, when the QoS enforcement application 506 receives a packet from the requesting application 502, the QoS enforcement application 506 may compare the value of the packet flow identification field to the initial value in the sequence of pseudorandom reference values, and if the value of the packet flow identification field fails to match the initial value, the QoS enforcement application 506 may compare the value of the packet flow identification field to the other values in the sequence of pseudorandom reference values. Thus, if one or more of the preceding packets 516, 518 is lost (i.e., not received by QoS enforcement application 506), the QoS enforcement application 506 may still provide the requested QoS to the subsequent packet 520 by matching its packet flow identification field to one of the pseudorandom reference values of the sequence maintained by the QoS enforcement application 506. In response to matching the packet flow identification field to one of the latter pseudorandom reference values of the sequence maintained by the QoS enforcement application 506, the QoS enforcement application 506 may execute the pseudorandom number generator a multiple number of times to update the sequence such that one pseudorandom reference value in the sequence is expected to be equal to the packet flow identification field of the next packet of the flow transmitted by the requesting application 502. In other words, the sequence of pseudorandom reference values is maintained substantially in sync with the pseudorandom number generator being utilized by the requesting application 502 in a manner that accounts for any lost packets. In this manner, the pseudorandom values can also be used by the network routing device to detect lost and/or corrupted packets.

Still referring to FIG. 5, and with continued reference to FIGS. 2 and 4, in accordance with another embodiment, a cryptographic hash function (e.g., SHA-256 or another suitable hash function) may be utilized by the requesting application 502 and the QoS enforcement application 506 to determine pseudorandom values for the packet flow identification field. In this embodiment, the requesting application 502 utilizes the key value as a pre-shared key when performing a cryptographic one-way hash of a portion of a packet to be transmitted (e.g., the payload or non-header data of the packet, a coarse-grained timestamp, or the like) to obtain a pseudorandom number for use as the packet flow identification field of that packet. For example, the requesting application 502 utilizes the key value received 512 from the QoS broker application 504 when performing a hash of the data corresponding to the initial packet 516 and then utilizes the resulting pseudorandom number (or a selected portion thereof) as the value of the packet flow identification field of the initial packet 516. When the QoS enforcement application 506 receives the initial packet 516 from the requesting application 502, the QoS enforcement application 506 determines the pseudorandom reference value for the received packet 516 by utilizing the key value received 414 from the QoS broker application 504 (which is the same as the key value provided 412 to the requesting application 502) to perform the same cryptographic hash function as performed by the requesting application 502 on the same portion of the received packet 516 (e.g., the payload of the packet 516) as was utilized by the requesting application 502. The QoS enforcement application 506 compares the resulting pseudorandom reference value to the value of the packet flow identification field of the received packet 516, and when the received value for the packet flow identification field matches the pseudorandom reference value, the QoS enforcement application 506 provides the requested QoS to the received packet 516 in similar manner as set forth above (e.g., by modifying or otherwise reformatting the received packet 516 for downstream transmission with the requested QoS). For a subsequent packet 518, 520 of the flow, the requesting application 502 again performs the cryptographic hash of the payload of a respective packet 518, 520 to obtain pseudorandom number for use as the packet flow identification field of that packet 518, 520. Thus, as the payload varies on a packet-by-packet basis, the values for the packet flow identification fields of the transmitted packets will vary, such that the value of the packet flow identification field for an individual packet within the flow of packets may be different from the packet flow identification field of the preceding and/or succeeding packet in the flow.

Referring now to FIGS. 3-5, in the communications system 300, the QoS control process 400 begins in response to the QoS broker application 312 on the QoS brokering device 306 receiving a QoS request 510 from the requesting application 310 on the QoS requesting device 302 (e.g., via the first network routing device 303 and the first communications network 304). In response to receiving the QoS request 510, the QoS broker application 312 on the QoS brokering device 306 provides a key value 512 associated with the requested QoS to the requesting application 310. Additionally, the QoS broker application 312 configures the QoS enforcement applications 311, 313 on the network routing devices 303, 307 to provide the requested QoS to packets having values for the packet flow identification field that were generated using that key value. In this regard, the QoS broker application 312 may provide the key value to the QoS enforcement applications 311, 313, wherein the QoS enforcement applications 311, 313 are configured to implement the same pseudorandom number generator or cryptographic hash function utilized by the requesting application 310 with the key value provided by the QoS broker application 312. Alternatively, the QoS broker application 312 may configure the QoS enforcement applications 311, 313 to implement the same pseudorandom number generator or cryptographic hash function with the key value as provided to the requesting application 310. The QoS broker application 312 may also configure the QoS enforcement applications 311, 313 to provide the requested QoS to received packets having a value for the packet flow identification field indicative of the key value (i.e., packets a value for the packet flow identification field matching a pseudorandom reference value determined using the key value).

After the QoS broker application 312 provisions or otherwise configures the requesting application 310 and the QoS enforcement applications 311, 313 for use with the same key value, the requesting application 310 transmits a flow of packets intended to be handled with the requested QoS to a destination that is downstream from one or more of the network routing devices 303, 307 or otherwise located on a downstream communications network 304, 308. As described above, for each transmitted packet, the requesting application 310 utilizes the key value provided by the QoS broker application 312 to determine a pseudorandom value for the packet flow identification field of the packet header (either using a pseudorandom number generator or a cryptographic hash function). For each received packet from the requesting application 310, the first network routing device 303 and/or QoS enforcement application 311 determines a pseudorandom reference value using the key value provided by the QoS broker application 312 and the same pseudorandom number generation method as the requesting application 310, and compares the value for the packet flow identification field of the received packet to the pseudorandom reference value in a similar manner as set forth above. For each packet having a value for its packet flow identification field that matches the pseudorandom reference value associated with that packet, the first network routing device 303 provides the requested QoS associated with the key value to that packet when transmitting it over the first communications network 304. Likewise, in response to receiving packets from the first communications network 304 that are being transmitted by the requesting application 310, the second network routing device 307 and/or QoS enforcement application 313 determines a pseudorandom reference value using the key value provided by the QoS broker application 312 and the same pseudorandom number generation method as the requesting application 310, and the second network routing device 307 compares the values for the packet flow identification fields of the received packets to the pseudorandom reference values, as described above. For each packet having a value for its packet flow identification field that matches the pseudorandom reference value associated with that packet, the second network routing device 307 provides the requested QoS to that packet when transmitting it over the second communications network 308.

One advantage of the QoS control process described above is that QoS may be provided in a secure manner. In this regard, due to the difficulty of spoofing pseudorandom values on a packet-by-packet basis, rogue applications and/or devices that are not privy to the key value and pseudorandom number generation method being implemented by a QoS enforcement device are unable to obtain a higher QoS. Thus, network resources may be securely allocated only to authorized requesting applications and/or devices.

For the sake of brevity, conventional techniques related to signal processing, data transmission, computer networks, cellular networks, cryptography, packets and/or data formatting, and other functional aspects of the systems (and the individual operating components of the systems) may not be described in detail herein. In addition, those skilled in the art will appreciate that embodiments may be practiced in conjunction with any number of network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms referring to structures do not imply a sequence or order unless clearly indicated by the context. Additionally, the foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of communicating a flow of related packets to a destination in a downstream communications network with a requested quality of service (QoS), the method comprising:
receiving a request from a requesting device for a particular QoS for a subsequent packet flow from the requesting device;
responsive to receiving the request, assigning a key value associated with the requested particular QoS to the subsequent packet flow;
receiving a first packet of the subsequent packet flow from the requesting device and at a QoS enforcement routing device, the first packet including a first subsequent packet flow identification field, for identifying related packets in a packet flow, having a first value;
determining, by the QoS enforcement routing device, a first reference value for the first subsequent packet flow identification field using the assigned key value;
facilitating, by the QoS enforcement routing device, downstream transmission, toward the destination, of the first packet of the subsequent packet flow at the requested particular QoS when the first value matches the first reference value;
receiving a second packet of the subsequent packet flow from the requesting device and at a QoS enforcement routing device, the second packet including a second subsequent packet flow identification field having a second value different from the first value;
determining, by the QoS enforcement routing device, a second reference value for the second subsequent packet flow identification field using the assigned key value;
facilitating, by the QoS enforcement routing device, downstream transmission, toward the destination, of the second packet of the subsequent packet flow at the requested particular QoS when the second value matches the second reference value; and
facilitating, by the QoS enforcement routing device, a default QoS different from the requested particular QoS to a third packet of the subsequent packet flow when a third value from a third subsequent packet flow identification field of the third packet does not match a third reference value determined using the assigned key value.

2. The method of claim 1, wherein:
determining the first reference value comprises generating, by the QoS enforcement routing device, a first pseudorandom value using the key value;
determining the second reference value comprises generating, by the QoS enforcement routing device, a second pseudorandom value using the key value.

3. The method of claim 1, the first packet including a first payload and the second packet including a second payload, wherein:
determining the first reference value comprises performing, by the QoS enforcement routing device, a cryptographic hash function on the first payload using the key value; and
determining the second reference value comprises performing, by the QoS enforcement routing device, the cryptographic hash function on the second payload using the key value.

4. The method of claim 1, wherein facilitating the requested particular QoS for the first packet comprises:
modifying, by the QoS enforcement routing device, the first subsequent packet flow identification field to have a fixed value associated with the requested particular QoS for the downstream communications network; and
providing the first packet with the modified packet flow identification field to the downstream communications network for further transmission to the destination.

5. The method of claim 1, further comprising:
providing the key value to the requesting device in response to receiving the request, the requesting device determining the first value using the key value.

6. The method of claim 5, further comprising identifying a pseudorandom number generation algorithm to the requesting device in response to receiving the request, wherein the requesting device determines the first value using the identified pseudorandom number generation algorithm with the key value as a seed value.

7. The method of claim 6, wherein determining the first reference value comprises determining, by a QoS enforcement gateway device, a pseudorandom reference value using the pseudorandom number generation algorithm with the key value as the seed value.

8. The method of claim 7, wherein the pseudorandom reference value is generated, by the QoS enforcement routing device, in response to receiving the first packet.

9. The method of claim 1, wherein:
the first reference value comprises a first pseudorandom value determined, by the QoS enforcement routing device, using the key value; and
the second reference value comprises a second pseudorandom value.

10. A method of communicating a plurality of related packets in a packet flow to a destination in a downstream communications network with a requested quality of service (QoS), the method comprising:
receiving a request from a requesting device for a particular QoS for a subsequent packet flow from the requesting device;
responsive to receiving the request, assigning a key value associated with the requested particular QoS to the subsequent packet flow;
receiving the plurality of related packets in the subsequent packet flow from the requesting device and at a QoS enforcement routing device, each packet including a subsequent packet flow identification field, for identifying related packets in the subsequent packet flow, wherein values of the packet flow identification field are made to vary across the plurality of related packets in the subsequent packet flow; and
for each respective packet in the plurality of related packets in the subsequent packet flow:
determining, by the QoS enforcement routing device, a reference value for the subsequent packet flow identification field of the packet using the key value;
when a received value for the subsequent packet flow identification field of the packet is equal to the reference value, facilitating, by the QoS enforcement routing device, downstream transmission, toward the destination, of the packet at the requested particular QoS; and
when a received value for the subsequent packet flow identification field of the packet does not match the reference value, facilitating, by the QoS enforcement routing device, downstream transmission, toward the destination, of the packet at a default QoS different from the requested particular QoS.

11. The method of claim 10, wherein determining the reference value comprises executing, by the QoS enforcement routing device, a pseudorandom number generator having a seed value equal to the key value.

12. The method of claim 10, wherein determining the reference value comprises utilizing, by the QoS enforcement routing device, the key value to perform a cryptographic hash.

13. The method of claim 10, further comprising:
providing the key value to the requesting device in response to receiving the request, wherein for each respective packet of the plurality of related packets in the subsequent packet flow, the requesting device determining a pseudorandom value for the subsequent packet flow identification field using the key value.

14. The method of claim 10, the plurality of related packets being received by the QoS enforcement routing device, wherein providing the requested particular QoS comprises:
modifying, by the QoS enforcement routing device, the packet for the requested particular QoS before providing the packet to the downstream communications network coupled to the QoS enforcement routing device; and
transmitting, by the QoS enforcement routing device, the packet to the downstream communications network for further transmission to the destination.

* * * * *